United States Patent Office 3,326,631
Patented June 20, 1967

3,326,631
METHOD OF PRODUCING LITHIUM FLUORIDE
Günther Kraft, Kronberg, Taunus, and Heinz Beck, Frankfurt am Main, Germany, assignors to Metallgesellschaft Aktiengesellschaft, Frankfurt am Main, Germany
No Drawing. Filed Mar. 2, 1964, Ser. No. 348,875
Claims priority, application Germany, Mar. 2, 1963, M 55,973
5 Claims. (Cl. 23—88)

This invention relates to a method of producing lithium fluoride.

A method of producing lithium fluoride consists in reacting solid lithium carbonate with an aqueous solution of hydrofluoric acid. Owing to the tendency of the lithium fluoride thus formed to occlude substantial quantities of lithium carbonate, a pure product cannot be thus obtained, or at least its production is possible only by procedures involving considerable trouble.

It is also known that lithium fluoride can be obtained from solid lithium chloride by reacting the latter with a considerable excess of bromine trifluoride in quartz vessels. This method of production gives rise to major difficulties and necessitates the provision of a diversity of apparatus and it is therefore unsuitable for application on an industrial scale.

Finally, it has been proposed to recover lithium fluoride from an aqueous solution of a lithium salt either by adding to it an alkali metal fluoride in a neutral or alkaline medium (for instance in the same way that lithium is precipitated with ammonium fluoride in an ammoniacal solution for the purpose of its analytical determination as lithium fluoride), or by reacting a solution of lithium hydroxide with an aqueous solution of hydrofluoric acid. The drawback of both these methods is that lithium fluoride is obtained in an extremely finely divided and voluminous form which is not easily if at all filtrable. For industrial purposes this simple method of precipitation is therefore likewise generally impracticable.

For industrial purpose it is therefore desirable to devise a method of producing a readily filtrable lithium fluoride by a reaction which can be performed in solution.

It has now been found that a surprisingly readily filtrable lithium fluoride can be obtained by a method which avoids the drawbacks of known processes.

According to the present invention there is provided a method of producing lithium fluoride from a solution containing lithium in solution, wherein there is added to the solution a substance containing fluorine thereby to precipitate lithium fluoride, and wherein the precipitation is started in an acid medium and completed by raising the pH.

Suitable substances containing fluorine are hydrofluoric acid, either in the form of an aqueous solution, or in gaseous form, or a fluoride in aqueous solution, which if desired may naturally also be added to the solution in the form of the solid salt.

A particularly convenient way of performing the present method is to precipitate lithium fluoride from an acid solution of lithium, sulphate having a pH less than or equal to 4, and preferably less than or equal to 2. For achieving an optimum yield, the addition of stoichiometric proportions of hydrofluoric acid followed by neutralisation with say an alkali metal carbonate or hydroxide is advisable. Precipitation can then be performed at room temperature or at elevated temperature.

The present method has the advantage that the lithium fluoride which is first precipitated in an acid medium crystallises in a readily filtrable form and in such manner that the further precipitation of lithium fluoride by subsequent neutralisation yields a coarsely crystalline product which can be removed from the solution by conventional separatory techniques without any trouble.

The present method is particularly useful and economical when applied to the recovery of lithium from lithium-containing liquors obtained in the preparation of lithium ores. In this application it is particularly desirable to achieve a high yield of lithium salt by a method involving few procedural steps. The precipitation of lithium in the form of lithium fluoride, which is one of the most difficulty soluble lithium salts, has been repeatedly tried but for the above explained reason, namely its difficult filtrability, the process could not be industrially used. Lithium carbonate or lithium phosphate which both have a solubility which is significantly better than that of lithium fluoride were therefore precipitated as a second best choice. The present method now permits the desired aim of precipitating lithium from solutions obtained in the preparation of lithium ores in the form of a fluoride in a manner suitable for industrial use to be accomplished.

The following examples illustrate the manner in which the method according to the present invention can be advantageously performed. In the following examples a neutral solution of lithium sulphate containing 15 g. of Li per litre was processed.

*Example 1.—Precipitation with hydrofluoric acid*

90 ml. of a 40 percent solution of hydrofluoric acid are added in one portion to one liter of a neutral solution of lithium sulfate of 20° C., containing 15 g. Li/l., whereby pH <2 is set. The precipitation of lithium fluoride is started instantly. Owing to this strong acid solution the lithium fluoride precipitates in a well filtrable form. Without filtration, subsequently 750 ml. of a soda solution, saturated at room temperature, are introduced in the course of about 10 minutes whilst stirring vigorously. The pH of the reaction mixture which now has a total volume of about 1.84 liters raises to 6 and the precipitation is completed. The lithium fluoride precipitates in a coarse, well filtrable crystalline form.

Having been allowed to settle for 5 minutes after completion of the sodium carbonate addition, the lithium fluoride is filtered off and washed twice with 100 ml. of $H_2O$ each time. There were obtained 52.8 g. of LiF (=14.2 g. Li). The filtrate (2.04 litres) contained 0.8 g. of Li. Precipitation yield: 94%.

*Example 2*

In the same manner as described in Example 1, 90 ml. of a 40 percent solution of hydrofluoric acid are added to one liter of a neutral solution of lithium sulfate of 20° C. pH <2 is reached and partial precipitation of LiF occurs. In variation to the process of Example 1 the precipitate in form of the well filtrable LiF is separated from the solution. The precipitation yield amounts to 40% in this state of process. The pH of the acid filtrate is slowly raised now to pH 6 by means of addition 750 ml. of a soda solution, saturated at room temperature. The manner of addition is equal to Example 1. If the filtrate was neutralised a fresh precipitation of lithium fluoride occured likewise in coarse crystalline form. After filtration 52% yield is obtained, accordingly the total yield was then 92%.

*Example 3.—Precipitation with sodium fluoride in acid solution*

10 ml. sulfuric acid (50%) are added to one liter of a neutral solution of lithium sulfate of 20° C., containing 15 g. Li/1. The acid, lithium containing solution has pH <2. Subsequently 2.5 l. of a 4%-solution of sodium fluoride are introduced whilst stirring, thus producing partial precipitation of lithium fluoride. By means of gradual addition of 75 ml. soda solution, saturated at room temperature, pH raises to 6 and the precipitation of well filtrable and coarse crystalline lithium fluoride is completed. The precipitate is prepared and separated in the same manner as described in Example 1. There were obtained 48.5 g. LiF (=13.5 g. Li). The filtrate contained 1.9 g. Li. Accordingly precipitation yield was 87%.

What we claim is:
1. In a method of precipitating lithium fluoride from an aqueous solution containing lithium ions in solution by addition to said solution of a fluoride soluble therein, the steps of initiating the precipitation of the lithium fluoride in a well filterable form at a pH not higher than 2 and subsequently raising the pH of the solution sufficiently to a pH up to the neutral point to effect further substantial precipitation of lithium fluoride in a well filterable form.
2. The method of claim 1 in which after initiation of the precipitation of the lithium fluoride the pH of the solution is raised to about 6 to effect the further precipitation of lithium fluoride.
3. The method of claim 1 in which the fluoride added to the lithium containing solution is hydrofluoric acid.
4. The method of claim 1 in which the fluoride added to the lithium containing solution is sodium fluoride.
5. The method of claim 1 in which the aqueous solution containing lithium ions is an aqueous solution of lithium sulfate.

References Cited

UNITED STATES PATENTS

| | | | |
|---|---|---|---|
| 2,840,453 | 6/1958 | Dwyer | 23—88 X |
| 3,007,770 | 11/1961 | Kawecki et al. | 23—88 X |
| 3,112,172 | 11/1963 | Archambault et al. | 23—88 X |
| 3,132,922 | 5/1964 | Goodenough et al. | 23—88 |
| 3,179,495 | 4/1965 | Goodenough | 23—88 |

OSCAR R. VERTIZ, *Primary Examiner.*

MAURICE A. BRINDISI, *Examiner.*

E. STERN, *Assistant Examiner.*